United States Patent
Michiels et al.

(10) Patent No.: US 10,700,849 B2
(45) Date of Patent: Jun. 30, 2020

(54) BALANCED ENCODING OF INTERMEDIATE VALUES WITHIN A WHITE-BOX IMPLEMENTATION

(71) Applicant: NXP B.V., Eindhoven (NL)

(72) Inventors: Wil Michiels, Eindhoven (NL); Philippe Teuwen, Louvain (BE)

(73) Assignee: NXP B.V., Eindhoven (NL)

( * ) Notice: Subject to any disclaimer, the term of this patent is extended or adjusted under 35 U.S.C. 154(b) by 1028 days.

(21) Appl. No.: 14/814,056

(22) Filed: Jul. 30, 2015

(65) Prior Publication Data
US 2017/0033922 A1 Feb. 2, 2017

(51) Int. Cl.
*H04L 9/00* (2006.01)
*G06F 21/14* (2013.01)
*G06F 21/72* (2013.01)
*H04L 9/06* (2006.01)

(52) U.S. Cl.
CPC .............. *H04L 9/002* (2013.01); *G06F 21/14* (2013.01); *G06F 21/72* (2013.01); *H04L 9/003* (2013.01); *H04L 9/0625* (2013.01); *H04L 9/0631* (2013.01); *G06F 2221/0748* (2013.01); *H04L 2209/16* (2013.01); *H04L 2209/34* (2013.01)

(58) Field of Classification Search
CPC ....... H04L 9/002; H04L 9/003; H04L 9/0625; H04L 9/0631; H04L 2209/16; H04L 2290/34; G06F 21/14; G06F 21/72; G06F 2221/0748
See application file for complete search history.

(56) References Cited

U.S. PATENT DOCUMENTS

| | | | | |
|---|---|---|---|---|
| 5,815,514 A | * | 9/1998 | Gray | G11B 20/10 341/58 |
| 10,097,342 B2 | | 10/2018 | Michiels et al. | |
| 2003/0084306 A1 | * | 5/2003 | Abburi | G06F 21/10 713/188 |
| 2004/0078588 A1 | * | 4/2004 | Chow | G06K 19/07363 726/36 |
| 2009/0254759 A1 | * | 10/2009 | Michiels | H04L 9/002 713/189 |
| 2010/0309964 A1 | * | 12/2010 | Oh | G06F 13/4243 375/219 |
| 2015/0262185 A1 | * | 9/2015 | Abe | G06F 21/6245 705/71 |
| 2016/0350520 A1 | | 12/2016 | Michiels et al. | |

OTHER PUBLICATIONS

Chow; S. et al; "A White-Box DES Implementation for DRM Applications"; Pre-proceedings for ACM DRM-2002 workshop; 16 pages (Oct. 2002).

(Continued)

*Primary Examiner* — Alexander Lagor
*Assistant Examiner* — Forrest L Carey

(57) ABSTRACT

A method of implementing a keyed cryptographic operation using a plurality of basic blocks, includes: generating a balanced encoding function; applying the balanced encoding function to the output of a first basic block; and applying an inverse of the encoding function to the input of a second basic block, wherein the second basic block receives the encoded output of first basic block as an input.

18 Claims, 7 Drawing Sheets

(56) References Cited

OTHER PUBLICATIONS

Chow; S. et al; "White-Box Cryptography and an AES Implementation"; 9th Annual Workshop on Selected Areas in Cryptography; 18 pages (Aug. 2002).
Michiels; Wil; "Opportunities in White-Box Cryptography"; IEEE Computer and Reliability Societies; pp. 64-67 (Jan./Feb. 2010).
Bos, J.W., et al, "Differential computation analysis: hiding your white-box designs is not enough", University of Technology Eindhoven, Cryptology ePrint Archive, vol. 2015/753, pp. 1-22, published Jan. 1, 2015.
Chow, S. et al, "A White-Box DES Implementation for DRM Applications", Cloakware Corporation, and Carleton University, 2002, pp. 1-16, Ottawa, Canada.
Chow, S. et al, "White-Box Cryptography and an AES Implementation", Cloakware Corporation, Aug. 15-16, 2002, 18 pages.

\* cited by examiner

BALANCED ENCODING OF INTERMEDIATE VALUES WITHIN A WHITE-BOX IMPLEMENTATION

TECHNICAL FIELD

Various exemplary embodiments disclosed herein relate generally to securing software components that perform a cryptographic function against attacks including balanced encoding of intermediate values within a white-box implementation.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. This has led to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

In the digital right management scenario, the attacker has complete control of the software enforcing the management and access to the protected content. Accordingly, the attacker can modify software and also seek to obtain cryptographic keys used to encrypt the protected content. Such keys may be found by analyzing the software Regarding key distribution, a media player has to retrieve a decryption key from a license database in order to play back the media. The media player then has to store this decryption key somewhere in memory for the decryption of the encrypted content. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of implementing a keyed cryptographic operation using a plurality of basic blocks, including: generating a balanced encoding function; applying the balanced encoding function to the output of a first basic block; and applying an inverse of the encoding function to the input of a second basic block, wherein the second basic block receives the encoded output of first basic block as an input.

Various embodiments are described wherein generating a balanced encoding function includes randomly selecting a balanced encoding function from a library of balanced encoding functions.

Various embodiments are described wherein generating a balanced encoding function includes using a random round robin process to select a balanced encoding function from a library of balanced encoding functions.

Various embodiments are described wherein generating a balanced encoding function includes: randomly generating an encoding function; and determining that the randomly generated encoding function is a balanced encoding function.

Various embodiments are described wherein generating a balanced encoding function includes: randomly generating a first encoding function; determining that the first randomly generated encoding function is not a balanced encoding function; randomly generating a second encoding function; and determining that the second randomly generated encoding function is a balanced encoding function.

Various embodiments are described wherein the keyed cryptographic operation is the data encryption standard.

Various embodiments are described wherein the keyed cryptographic operation is the advanced encryption standard.

Various embodiments are described wherein lookup tables implement the keyed cryptographic operation Various embodiments are described further comprising distributing the implementation of keyed cryptographic function.

Further various exemplary embodiments relate to a method of controlling a server that provides an application that implements a method of implementing a keyed cryptographic operation using a plurality of basic blocks, including: receiving a request from a user for the application that implements a method of implementing a keyed cryptographic operation using a plurality of basic blocks; and providing the user the application that implements a method of implementing a keyed cryptographic operation using a plurality of basic blocks, wherein the application was created by: generating a balanced encoding function; applying the balanced encoding function to the output of a first basic block; and applying an inverse of the encoding function to the input of a second basic block, wherein the second basic block receives the encoded output of first basic block as an input.

Further various exemplary embodiments relate to a non-transitory machine-readable storage medium encoded with instructions for implementing a keyed cryptographic operation using a plurality of basic blocks, including: instructions for generating a balanced encoding function; instructions for applying the balanced encoding function to the output of a first basic block; and instructions for applying an inverse of the encoding function to the input of a second basic block, wherein the second basic block receives the encoded output of first basic block as an input.

Various embodiments are described wherein instructions for generating a balanced encoding function includes instructions for randomly selecting a balanced encoding function from a library of balanced encoding functions.

Various embodiments are described wherein instructions for generating a balanced encoding function includes instructions for using a random round robin process to select a balanced encoding function from a library of balanced encoding functions.

Various embodiments are described wherein instructions for generating a balanced encoding function includes: instructions for randomly generating an encoding function; and instructions for determining that the randomly generated encoding function is a balanced encoding function.

Various embodiments are described wherein instructions for generating a balanced encoding function includes: instructions for randomly generating a first encoding function; instructions for determining that the first randomly generated encoding function is not a balanced encoding function; instructions for randomly generating a second encoding function; and instructions for determining that the second randomly generated encoding function is a balanced encoding function.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
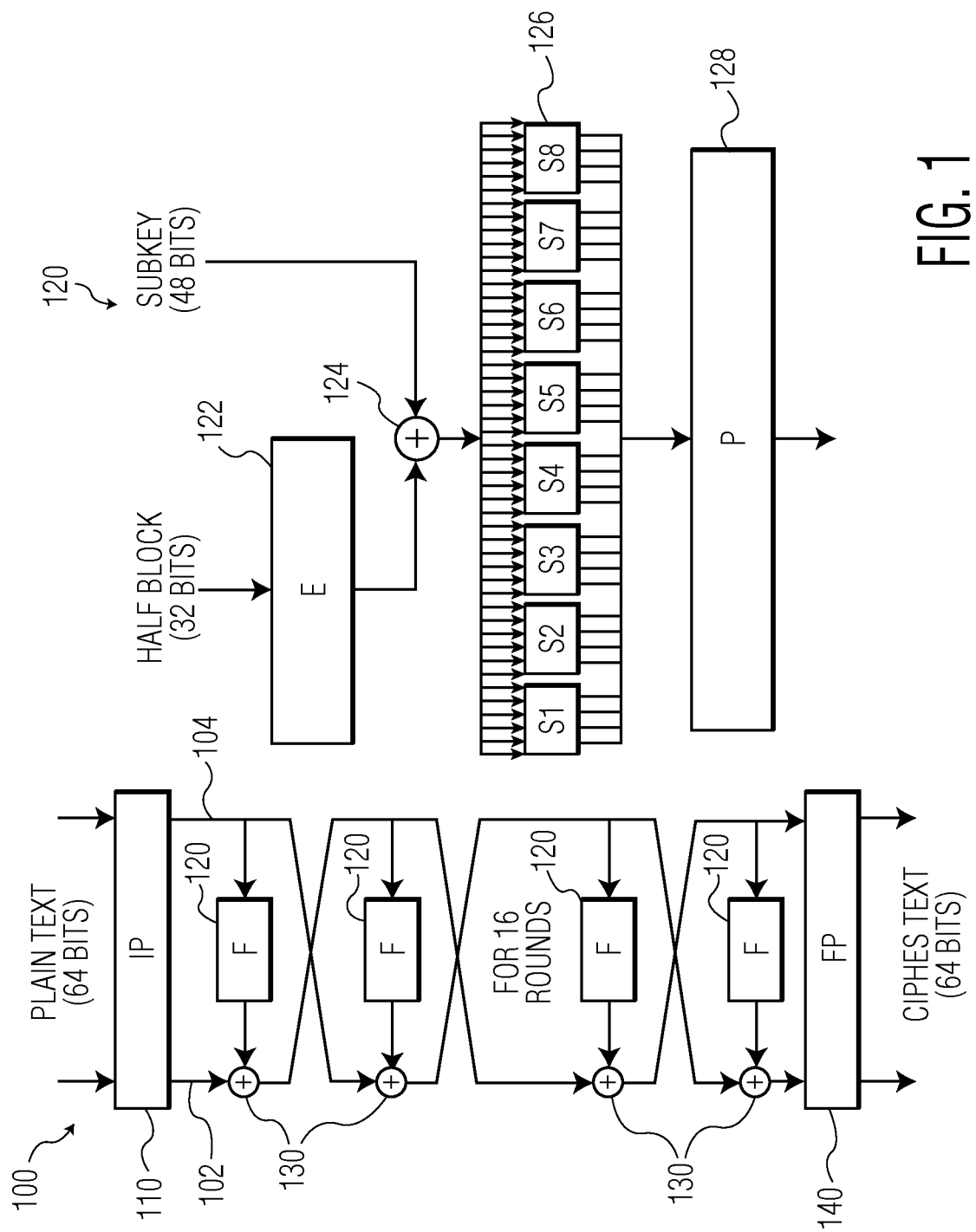
FIG. 1 illustrates the DES cipher.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented. While the description of embodiments below are directed to software implementation running on a processor, it is noted that these embodiments may also be partially or completely implemented in hardware as well. The lookup tables and finite state machines that are described may be implemented in hardware to carry out the various functions described.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any block cipher can be used as stream cipher using an appropriate mode of operation, e.g., Cipher feedback (CFB), Counter mode (CTR), etc.

The input message can represent, e.g., encrypted content data, such as multi-media data, including audio and/or video data. The encrypted content data may also include encrypted software, e.g., encrypted computer code representing some computer application, e.g., a computer game, or an office application. The input message may also represent a key for use in a further cryptographic operation. The latter may be used, for example, in a key exchange protocol, wherein a white-box implementation according to the invention encrypts and/or decrypts data representing a new key. The input data may also be plain data, for example, plain user data. The latter is especially advantageous in message authentication schemes. A white-box implementation according to the invention may have the property that the implementation may only be used for encryption, only be used for decryption, but not for both. For example, this property can be achieved if the implementation uses look-up tables which are not bijective, for example, a look-up table having more input bits than output bits. Accordingly, if a user only has a white-box decryptor, he may verify a MAC code but not create new MACs. This strengthens the non-repudiation properties of such a message authentication scheme.

The white-box implementation may be implemented using a plurality of basic blocks. The plurality of basic blocks is interconnected, in the sense that some of the blocks build on the outputs of one or more of the previous blocks. A basic block may be implemented in hardware, for example, as a computer chip. A basic block may use a switch board, a state machine or any other suitable construction for implementing functions in computer hardware. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block, which may be used both in software and hardware, is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bitstrings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number of input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message.

An interesting category of attacks on white-box implementations are differential attacks like DPA (Differential Power Analysis) and CPA (Correlation Power Analysis).

In differential attacks, the attacker collects a large number of execution traces for the white-box implementation, each with a different, but known plaintext. In CPA and DPA attacks, this trace is a power trace, but it may also be something different. The traces can be written as a matrix t where $t_{i,j}$ denotes the trace-value (e.g., power consumption) at time point j for trace i.

Then the attacker chooses some intermediate value v or a function $f(v)$ thereof in a standard implementation that has some relation to a limited number of key-bytes. Because $f(v)$ equals v if $f$ is the identity function, $f(v)$ may be referred to in both cases.

The value $f(v)$ is determined in the standard implementation for different guesses/hypotheses of the key bits on which the value depends and for the different plaintexts for which there is an execution trace. For the ith plaintext and the jth key hypothesis, this gives the value $f(v_{i,j})$.

Then, a so-called distinguisher may be used to determine which key-hypothesis k results in values $f(v_{i,k})$ that most likely are associated with the traces in matrix t. Two well-known strategies for the distinguisher are as follows:

Correlation attack: For each key hypothesis k and time point p, the attacker determines the correlation between $f(v_{i,k})$ and $t_{i,p}$ over all traces. For the correct key-hypothesis, the correlation will typically be higher than for an incorrect key-hypothesis; and Difference of means: If $f$ maps values to 0 or 1, then the attacker may compute for the different positions p, the average of tip over all i with $f(v_{i,k})$=0 and the average of $t_{i,p}$ over all i with $f(v_{i,k})$=1. The candidate keys are the ones for which the maximum difference in mean is the largest.

In hardware implementations where a white-box attack model is not assumed, attacks like this are typically prevented by adding random noise to the execution. This approach does, however, not work for white-box implementations because in a white-box attack model an attacker may disable the source generating the random data.

An approach often taken by white-box implementations to hide intermediate values is to encode them. To harden an white-box implementation against differential attacks, embodiments are described that choose the encodings such there is minimal leakage of information that is exploited by the attacks.

As described above, the differential attacks works by considering an intermediate value v that depends on part of the key and part of the input of the white-box implementation. White-box implementations typically work by encoding intermediate results. Furthermore, these intermediate results may be embedded in a larger bitstring before being encoded. This means that v occurs as an intermediate result in the white-box implementation as E(v,s), where s is a bitstring that will typically also be computed within the white-box implementation and E is the encoding function.

A feature of the embodiments described herein is that E is chosen such that the individual bits of E(v,s) do not leak any information on v. So, if the execution traces contain information on the bits of E(v,s) (e.g., bits of memory accesses), then these do not leak information on v. More precisely, this property means that E is chosen such that for the different values v, the individual bits of E(v,s) are 0 and 1 with approximately the same probability. Let $<x>_j$ denote the jth bit of bitstring x. Then, by modelling s as a random value, this condition may be formalized as that for all bit positions j a constant $C_j$ exists such that $$\forall_v \text{Prob}\{<E((v,s)>_j=1\} - \text{Prob}\{<E((v,s)>_j=0\} \approx C_j. \quad (1)$$

To illustrate, observe that if for fixed v the value s attains each value with the same probability of $2^{-s}$, this condition is satisfied if $$\#_s(<E((v,s)>_j=1) \approx \#_s(<E((v,s)>_j=0).$$

Consider the execution trace given by the bitstring obtained by sequencing all intermediate results of a white-box implementation. Then, it may easily be verified that if equation (1) holds, the differential attack with the difference of means as distinguisher does not work if it is applied on $f(v)$ for any function $f$.

This remains true if in the execution trace the intermediate values are not split into bits, but are sequenced as complete values. Also if the correlation attack is the distinguisher, this remains true. Note that, where for the difference-of-means distinguisher, function $f(v)$ should be a binary value, this need not be the case for the correlation attack.

How to determine good targets for enforcing equations (1) will now be discussed. Typically, differential attacks as described work by making hypotheses on the round-key part that is added to the input or output of an S-box. If it is desired to protect against these kind of attacks, it means that equation (1) should hold for values u found in a first round of the white-box implementation that can be written as u=v|s. Here, v and s are such that: they are both non-empty bitstrings; v is the smallest part of u that depends on the input of an S-box S; and s does not depend on S.

An embodiment will now be shown applying the above described ideas to a table-based white-box DES implementation. First, there will be a brief discussion of the DES cipher. Next, a white-box implementation of DES will be described. This white-box implementation is a simplified version of the one presented by Chow et al. This white-box implementation will be vulnerable to differential attacks as described. Finally it will be shown how the ideas described above can be applied to protect against these attacks.

Chow presents white-box implementations for AES and DES. What these white-box implementations have in common is that they implement the cipher by means of an obfuscated table network. As these white-box implementations are rather complicated to discuss, a simpler implementation will be used to explain the embodiments described herein. However, this simpler white-box implementation still has the essential properties of Chow's white-box implementation being that all operations are written as obfuscated lookup tables and that all intermediate results are encoded. Below, this simplified white-box DES implementation is discussed.

FIG. 1 illustrates the DES cipher. Encryption and decryption only differ from each other in the order of the round keys. The DES cipher 100 includes 16 rounds. Before the first round there is an initial permutation (IP) 110, and after the last round there is a final permutation (FP) 140. The 64-bit input of a round in divided into two 32-bit halves 102, 104. The right half becomes the left half of the next round. In addition, a round function (F) 120 is applied to the right half and the result is XORed 130 with the left half. This produces the right half of the next round. Such a structure is called a Feistel scheme. This round structure is repeated for 16 rounds.

The right-hand side of FIG. 1 depicts the round function (F) 120 of DES. First, its 32-bit input is expanded to 48 bits by copying 16 of its bits (the outer 2 bits of the nibbles) by the expansion operator (E) 122. The expanded 48 bits of output are XORed 124 with round subkey. This results in eight 6-bit values that are input into 8 different S-boxes (S1-S8) 126. Each of the S-boxes in the set of S-boxes (S1-S8) 126 are the same for different rounds. Each S-box maps its 6-bit input to a 4 bit output. The 32-bit output of the round function is finally obtained by applying a fixed 32-bit permutation (P) 128 on the output of the S-boxes.

Now a description of a white-box DES implementation is provided.

Figure 2:
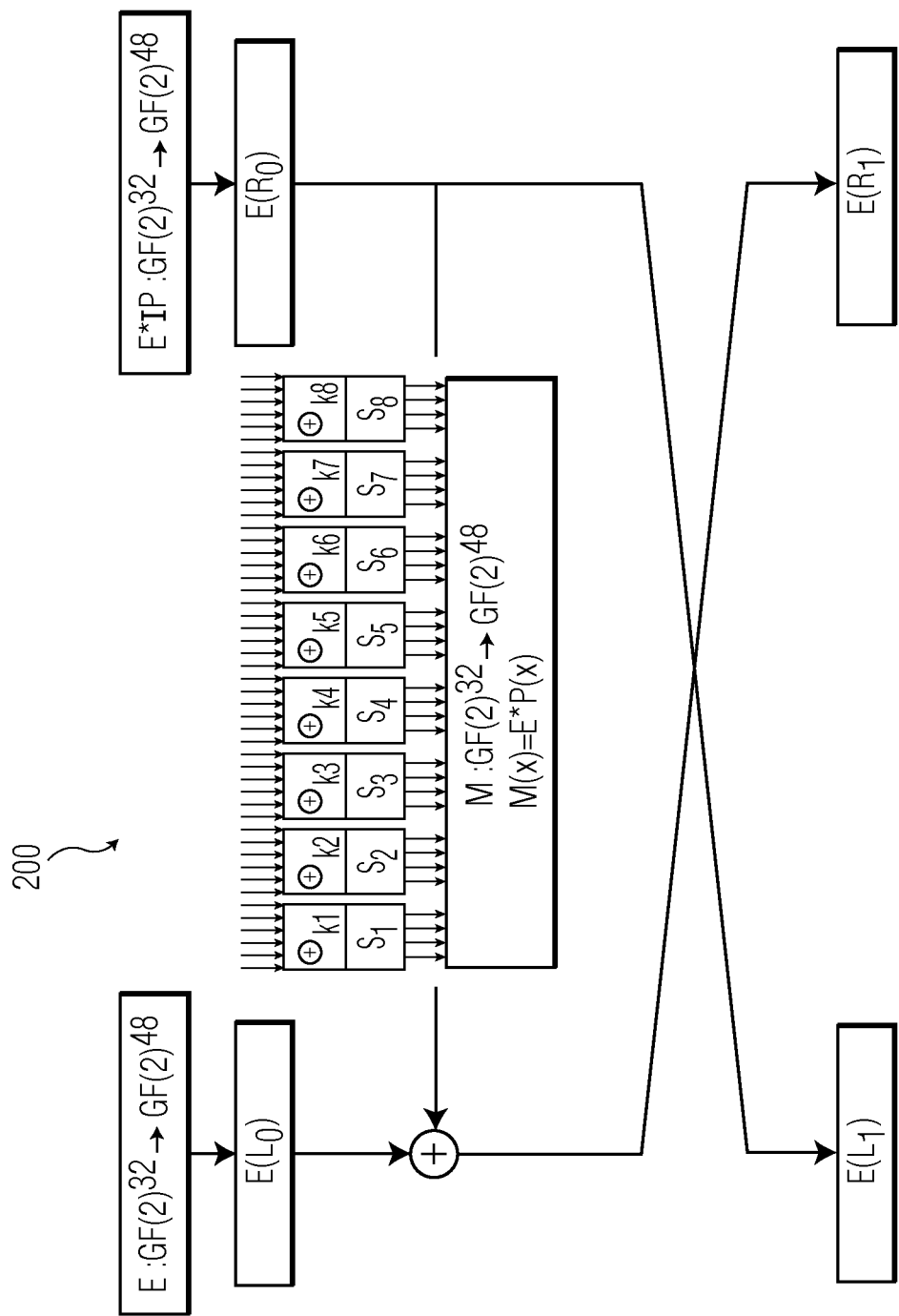
FIGS. 2, 3, and 4 illustrate an alternative formulation of DES.
Figure 3:
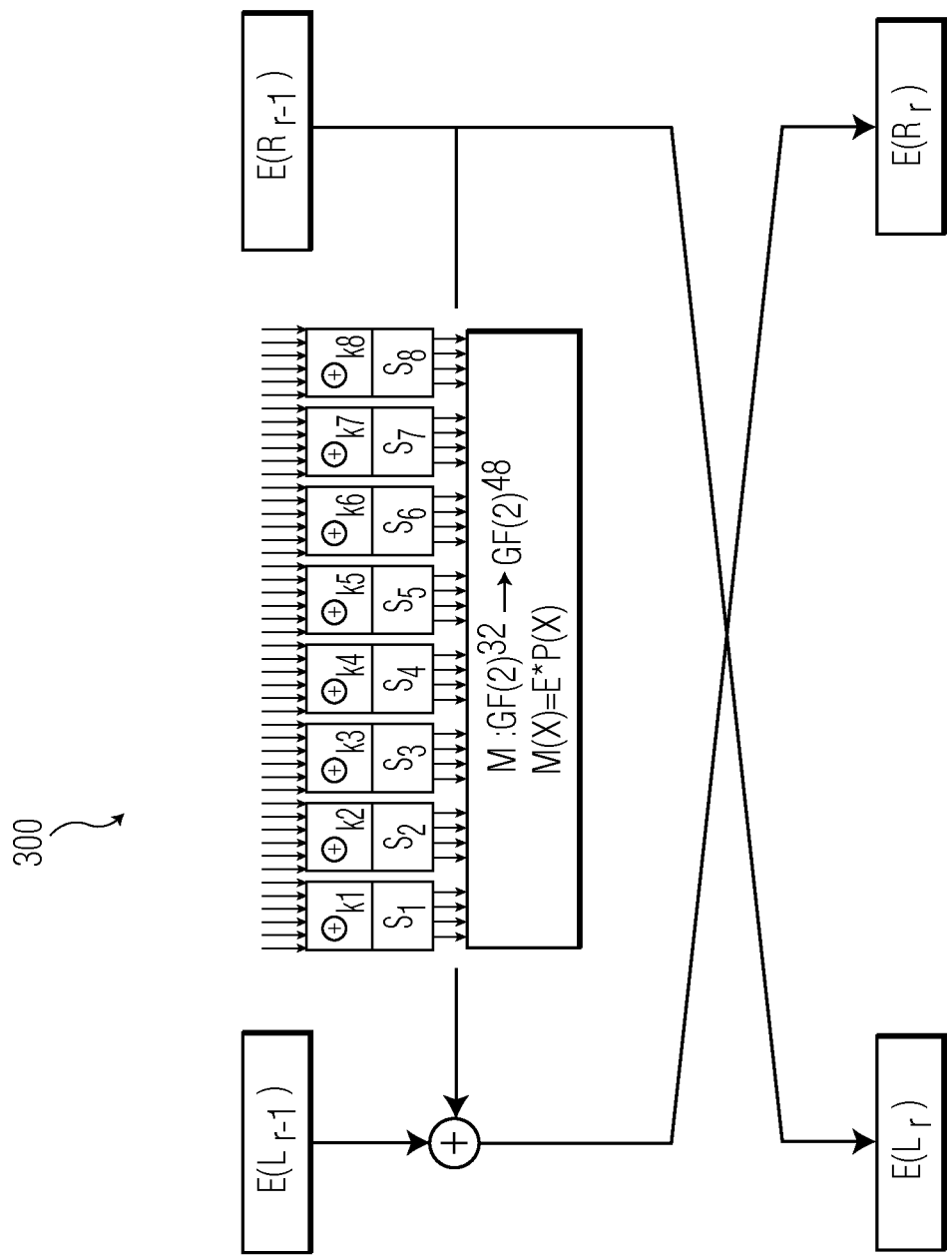
Figure 4:
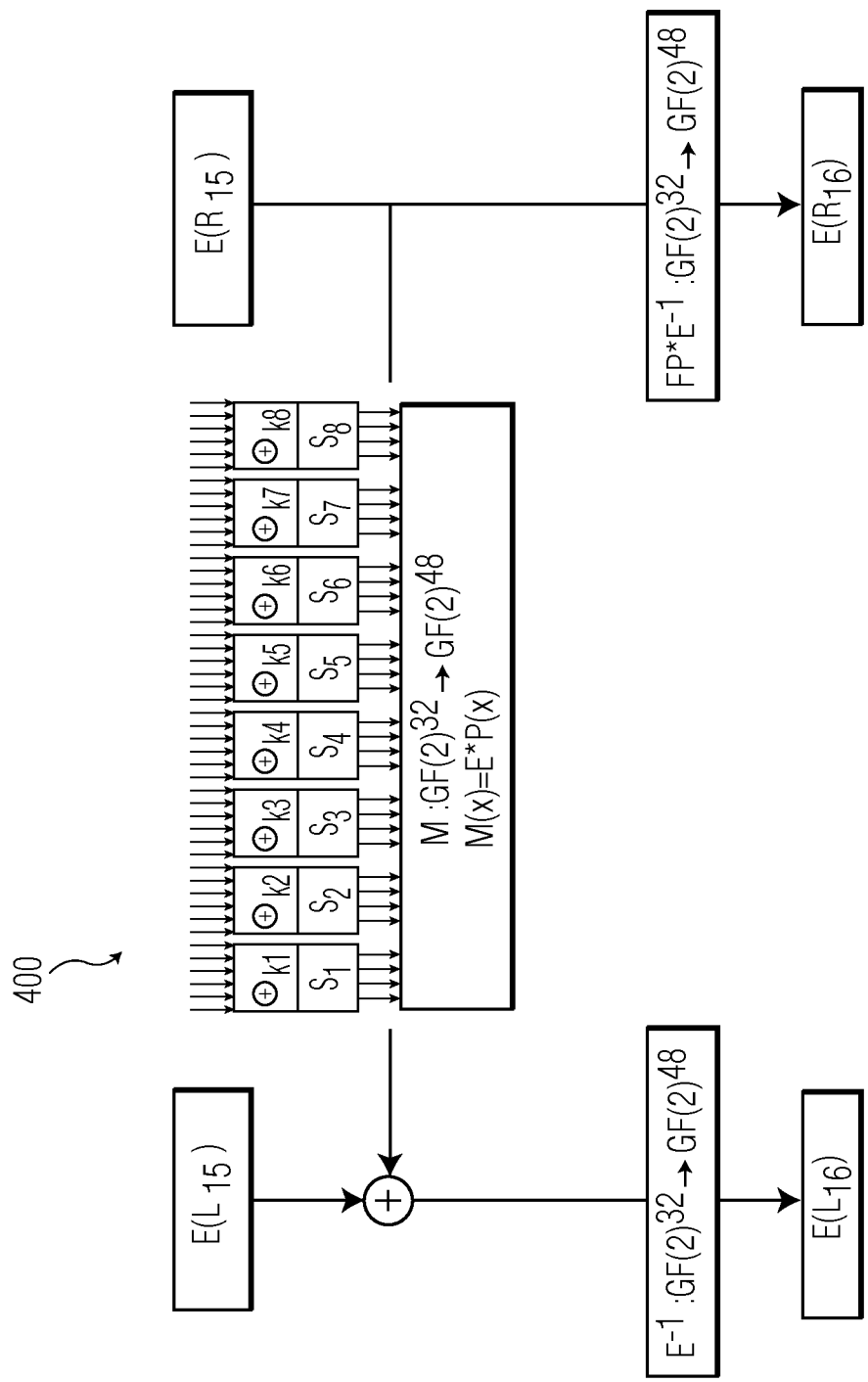

First an alternative formulation 200 of DES is determined as illustrated in FIGS. 2-4. Instead of a 64-bit data block that is split into a 32-bit left half and a 32-bit right half, the intermediate value become these two values to which the expansion operator is applied. For the first round, as shown in FIG. 2, this means that the input has to be preprocessed with the expansion operator, and for the last round, as shown in FIG. 4, it means that the output has to be postprocessed by removing the copy of the bits that are duplicated by the expansion operator. This postprocessing operation is denoted as $E^{-1}$. For the intermediate rounds, as shown in FIG. 3, it means that, instead of applying the expansion operator to the input of the S-boxes of round r, the expansion operator is applied to the output of the round function in the previous round r−1. That is, the expansion operator is applied after the permutation operation. By merging the permutation and expansion operation into a multiplication with a single matrix M and by integrating the key-addition operation in the S-box operation, the formulations depicted in FIGS. 2, 3, 4, 5, and 6 are obtained. Based on these formulations, a white-box implementation will be derived.

The derivation of the white-box implementation includes two steps. In the first step, the implementation is written as a network of lookup tables. In the second step, the obtained network of lookup tables are obfuscated.

Writing DES as Network of Lookup Tables

Figure 5:
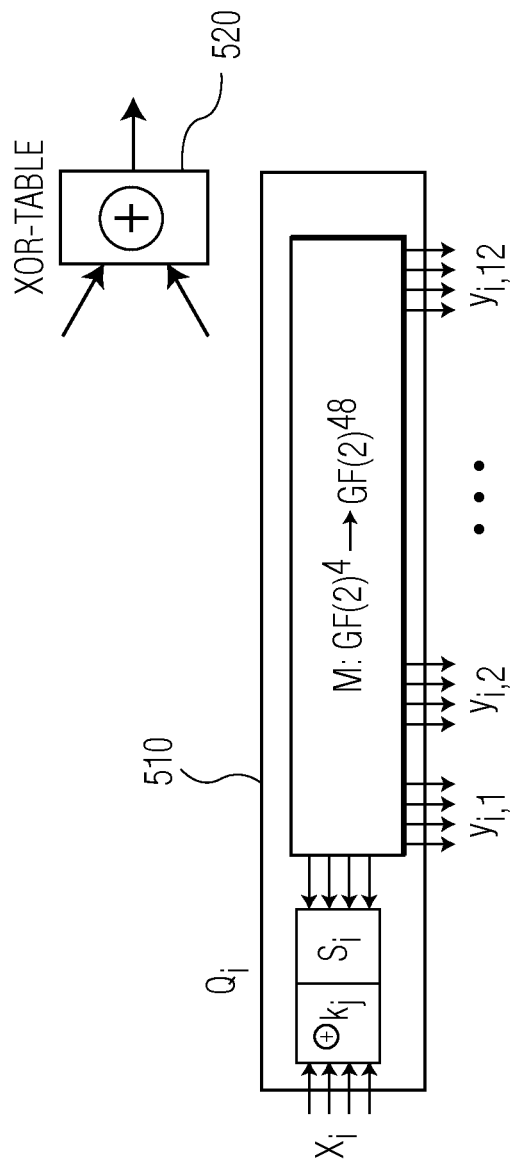
FIG. 5 illustrates a white-box implementation of the round function and XOR function of the DES cipher using only lookup tables.

First, the matrix M is partitioned into 8 stripes of 4 columns, that is, $M_i$ with i=1, 2, . . . , 8 is defined as a 48 by 4 matrix, such that $M=(M_1 \; M_2 \ldots M_8)$. In order to simplify the notation, $M_i$ is also as the linear mapping associated with the matrix multiplication with $M_i$. Then, the 48-bit output of the round function is given by $y=\oplus_{j=1}^{8} M_i \circ S_i(x_i)$. If an 6-to-48-bit lookup table $Q_i$ 510 is defined for each function such that $Q_i: y_i = M_i \circ S_i(x_i)$, and if a lookup table for the XOR of two 3-bit words is defined, the computation of the round-function output y may be written as a network of lookup tables where the output y is calculated as $y=\oplus_{j=1}^{8} M_i \circ S_i(x_i)$. Furthermore, by using XOR-lookup tables 520, the Feistel structure may be implemented by only using lookup tables. FIG. 5 illustrates a white-box implementation of the round function and XOR function of the DES cipher using only lookup tables. To implement a round of the DES cipher, eight Q-tables $Q_1, \ldots Q_8$ would be needed with a number of XOR-lookup tables 520 to combine the outputs of the eight Q-tables.

Obfuscating Network of Lookup Tables

Figure 6:
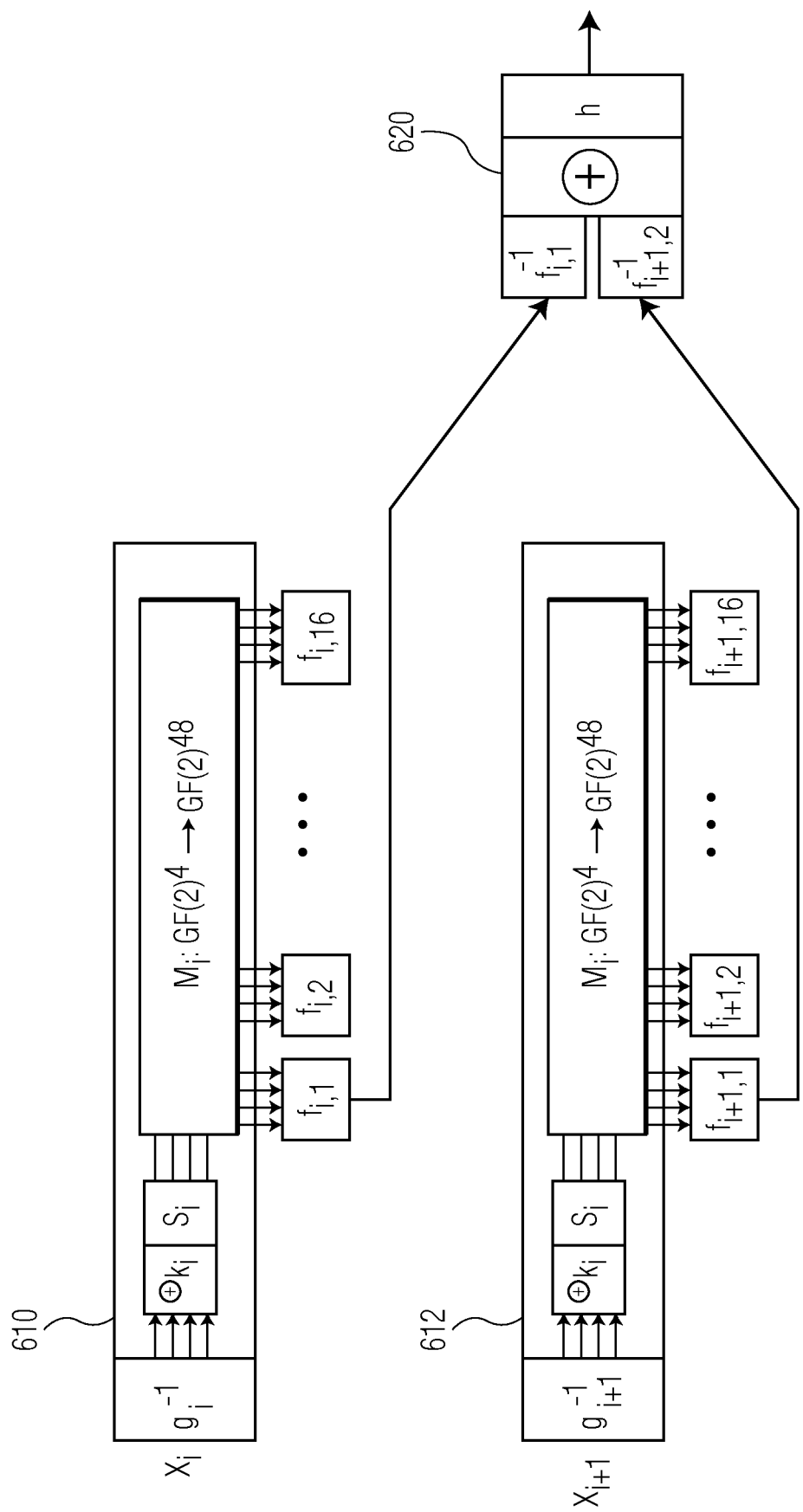
FIG. 6 illustrates the obfuscation of the white-box implementation of FIG. 3.

In the implementation described in FIG. 5, the key may easily be extracted from the Q-tables. Just applying the inverse of the expansion operation (E), permutation operation (P), and S-box operation to the output gives the plain key-addition operation. To prevent this, the input and outputs of all lookup tables may be encoded with arbitrary bijective functions. This means that a lookup table is merged with an encoding function that encodes the output and merged with a decoding function that decodes the input. The encodings are chosen such that the output encoding of one table matches the input encoding assumed in the next tables. FIG. 6 illustrates the obfuscation of the white-box implementation of FIG. 5. More specifically, FIG. 6 illustrates decoding the obfuscated the input of the Q-table using a function $g_i^{-1}$ and obfuscating the twelve outputs of the Q-table using the functions $f_{i,1} \ldots f_{i,12}$. Further the inputs of an XOR-table 620 that succeeds the Q-table a decoded using the appropriate inverse $f_{i,j}^{-1}$. The output of the XOR-table 620 is then encoded using the function h. In this example two Q-tables 610, 612 are illustrated and the first 3 bits of their outputs are combined by the XOR-table 620. This structure can be expanded to implement the complete round functions. Note that in the white-box implementation obtained, both the lookup tables and the intermediate values are obfuscated. For the first round, the input of the Q-tables does not have an input decoding in order to be compatible with DES. For the same reason, there are no output encodings on the last XOR-tables of the last round.

Consider the encoded output g(x) of a final XOR of the first round, such as for example XOR 620 of FIG. 6. Because the XOR-tables implement the XOR of two 3-bit values, g(x) is a 3-bit value and forms half the input of a Q-table in Round 2. From the definition of the permutation and expansion operator of DES (not given here), it follows that all $x=b_1; b_2; b_3$ for bits $b_i$ where each $b_i$ is an output bit of a different S-box. This enables an attacker to perform a differential difference-of-means attack in the following manner. Let $b_1$ be an output bit of the jth S-box $S_j$. In terms of the description given above of the differential attack, an attacker may perform the following differential attack:

generate for a large number of inputs execution traces, where an execution trace is obtained by sequencing all intermediate results of the implementation;

consider the S-box that has x as input; the intermediate value v from the standard implementation on which the attack is applied is bit $b_1$ contained in the output of this S-box;

make guesses of the 6-bit word $k_j$ of the first-round's round-key that is XORed with the input of $S_j$; for all these guesses, determine the value $v=b_1$; for the ith plaintext and the jth key hypothesis, this value is written as $b_{i,j}$; and use a Difference-of-Means as a distinguisher, this means that for each key hypothesis j and location p determine $avg_0(p,j)=\Sigma_{i, b_{i,j}=0} t_{i,p}$ and $avg_1(p,j)=\Sigma_{i, b_{i,j}=1} g(x^{(i)})$; note that the location $\hat{p}$ in the execution traces that contains the value g(x) results in $avg_0(\hat{p},j)=\Sigma_{i, b_{i,j}=0} g(x^{(i)})$ and $avg_1(\hat{p},j)=\Sigma_{i, b_{i,j}=1} g(x^{(i)})$, where $x^{(i)}$ represents value x for the ith input.

The correct key will be for the j where $max_p |avg_0(p,j)-avg_1(p,j)|$ is maximal.

To implement an embodiment resistant to a differential attack a balanced encoding as described below is used such that $$\text{Prob}\{<g(x)>_j=1\}-\text{Prob}\{<g(x)>_j=0\}$$

is constant for all $b_1$. For randomly chosen inputs, it is noted that $s=b_2,b_3$ equals all possibilities 00, 01, 10, 11 with the same probability. Hence, the above condition is satisfied if for $$\#_s(<E((v,s)>_j=1) \approx \#_s(<E((v,s)>_j=0)$$

An example of a balanced encoding with these properties is given in the following table:

| x | g(x) |
|---|---|
| 0 = (0, 0, 0) | 1 = (0, 0, 1) |
| 1 = (0, 0, 1) | 2 = (0, 1, 0) |
| 2 = (0, 1, 0) | 6 = (1, 1, 0) |
| 3 = (0, 1, 1) | 5 = (1, 0, 1) |
| 4 = (1, 0, 0) | 4 = (1, 0, 0) |
| 5 = (1, 0, 1) | 7 = (1, 1, 1) |
| 6 = (1, 1, 0) | 3 = (0, 1, 1) |
| 7 = (1, 1, 1) | 0 = (0, 0, 0) |

Note that The first 4 rows contain the values for $b_1=0$ and the last 4 rows contain the values for $b_1=1$ for the input value x. It is noted that indeed for each of these 4 rows, 0 occurs twice and 1 occurs twice at each bit position. It can be verified that this also holds if the rows are split according to whether $b_2$ and $b_3$ are 0 or 1. Hence, this balanced encoding function also works if instead of $b_1$ the attack is applied to bits $b_2$ and $b_3$.

The balanced encoding function demonstrated is just one example. Other balanced encodings may be used as well as long as the output of the encoding function has an equal number of 0's and 1's at each bit position for all possible inputs. Further, encoding functions for longer bit strings may also be shown.

The developer of a white-box implementation may therefore use balanced encoding to resist differential attacks on the white-box implement. Accordingly, when the various basic blocks of the white-box implementation are modified to incorporate input decoding and output encoding, a balanced encoding and its inverse decoding will be selected. This may be done in various ways. In a first embodiment, a library of balanced encodings may be used, and the developer may randomly select a specific one of the balanced encodings from the library. This encoding may be used to encode the output of a specific basic block and to decode the input to a succeeding basic block. This process may be repeated for each of the basic blocks requiring encoding of its outputs. Also, the balanced encodings may be selected using a random round robin process. That is, balanced encodings are randomly selected, but if the selected balanced encoding has been using in the round, then another unused balanced encoding is selected. This may be done until all of the encodings in the library have been used during the round, or until a certain number of the encodings have been used in the round, and then a new round may be begun. In a second embodiment, encoding functions may be randomly generated. Then the random encoding function is evaluated to determine if it is a balanced encoding function. If so, then it may be used. If not, it is discarded and another encoding function is randomly generated and evaluated.

Further, the developer of the white-box implementation may keep track of the balanced encoding functions used and how often each function is used. This may be done to monitor that the balanced encoding functions are used in an apparently random fashion. Accordingly, if one balanced encoding function is selected and it is determined that it has been used significantly more than other balanced encoding functions, it may be discarded and another balanced encoding function may be selected.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

The cryptographic system described herein may be implemented on a user device such as a mobile phone, table, computer, set top box, smart TV, etc. A content provider, such as a television network, video stream service, financial institution, music streaming service, etc., may provide software to the user device for receiving encrypted content from the content provider. That software may have the encryption key embedded therein as described above, and may also include binding strings as described above. Then the content provider may send encrypted content to the user device, which may then decrypt using the supplied software and use the content.

Figure 7:
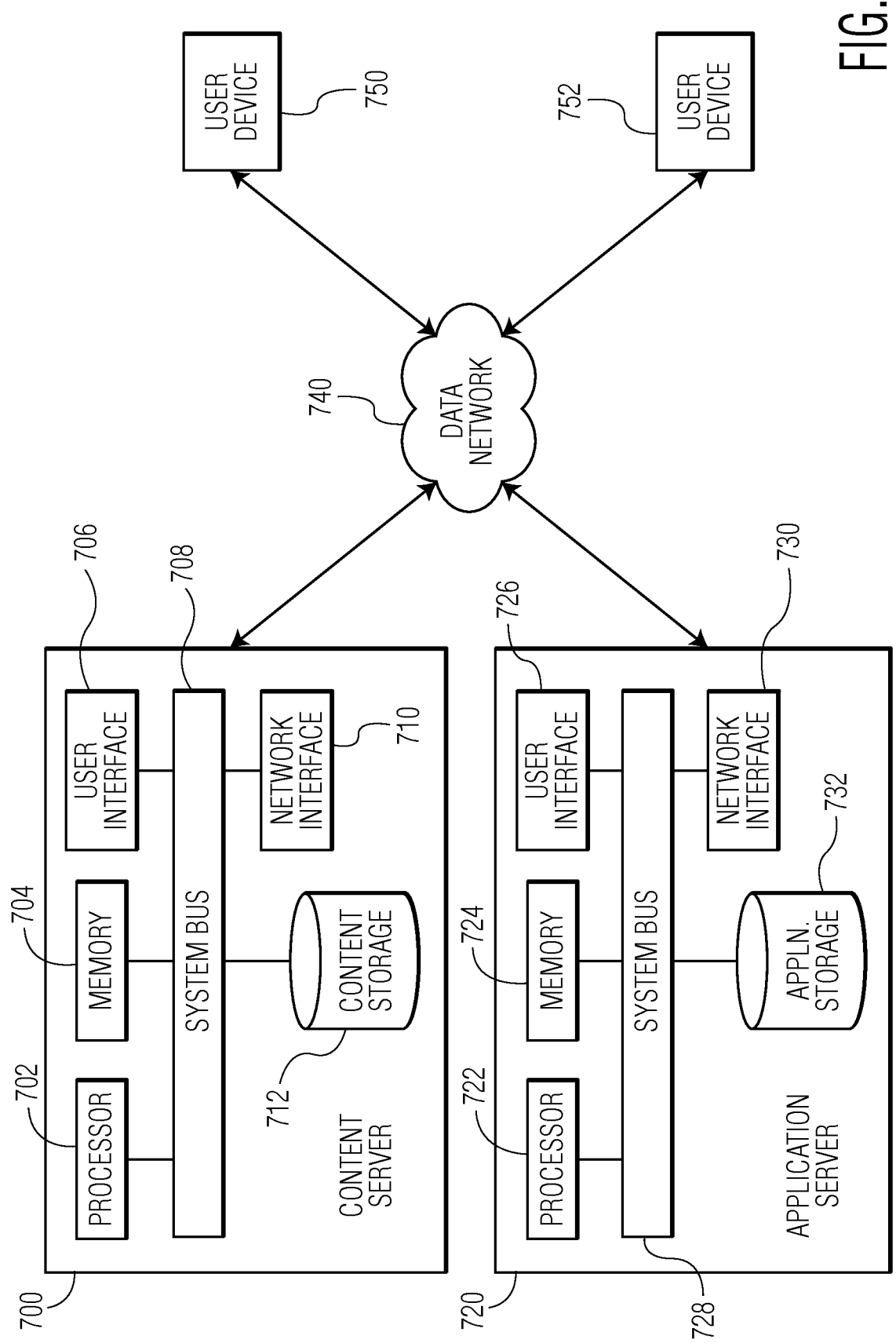
FIG. 7 illustrates a system for providing a user device secure content and a software application that processes the secure content.

FIG. 7 illustrates a system for providing a user device secure content and a software application that processes the secure content. The system includes a content server 700, application server 780, user devices 750, 752, and a data network 740. The user devices 750, 752 may request access to secure content provided by the content server 700 via data network 740. The data network can be any data network providing connectivity between the user devices 750, 752 and the content server 700 and application server 780. The user devices 750, 752 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 700. The software application may be downloaded from the application server 780. The software application may be obscured using the techniques described above as well as operate as described above. Once the user devices 750, 752 install the software application, the user device may then download secure content from the content server 700 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 700 may control the access to the secure content provided to the user devices 750, 752. As a result when the content server 700 receives a request for secure content, the content server 700 may transmit the secure content to the requesting user device. Likewise, the application server 720 may control access to the software application provided to the user devices 750, 752. As a result when the content server 720 receives a request for the software application, the application server 720 may transmit the software application to the requesting user device. A user device requesting the software application or secure content may also be authenticated by the respective servers, before providing the software application or secure content to the user device.

The content server 700 may include a processor 702, memory 704, user interface 706, network interface 710, and content storage 712 interconnected via one or more system buses 780. It will be understood that FIG. 7 constitutes, in some respects, an abstraction and that the actual organization of the components of the device 700 may be more complex than illustrated.

The processor 702 may be any hardware device capable of executing instructions stored in memory 704 or storage 712. As such, the processor may include a microprocessor, field programmable gate array (FPGA), application-specific integrated circuit (ASIC), or other similar devices.

The memory 704 may include various memories such as, for example L1, L2, or L3 cache or system memory. As such, the memory 702 may include static random access memory (SRAM), dynamic RAM (DRAM), flash memory, read only memory (ROM), or other similar memory devices.

The user interface 706 may include one or more devices for enabling communication with a user such as an administrator. For example, the user interface 706 may include a display, a mouse, and a keyboard for receiving user commands.

The network interface 710 may include one or more devices for enabling communication with other hardware devices. For example, the network interface 710 may include a network interface card (NIC) configured to communicate according to the Ethernet protocol. Additionally, the network interface 710 may implement a TCP/IP stack for communication according to the TCP/IP protocols. Various alternative or additional hardware or configurations for the network interface 710 will be apparent.

The content storage 712 may include one or more machine-readable content storage media such as read-only memory (ROM), random-access memory (RAM), magnetic disk storage media, optical storage media, flash-memory devices, or similar storage media. In various embodiments, the content storage 712 may store content to be provided to users.

The application server 720 includes elements like those in the content server 700 and the description of the like elements in the content server 700 apply to the application server 720. Also, the content storage 712 is replaced by application storage 732. Further, it is noted that the content server and applications server may be implemented on a single server. Also, such servers may be implemented on distributed computer systems as well as on cloud computer systems.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of implementing a keyed cryptographic operation using a plurality of basic blocks, comprising:
generating, by a processor, a balanced encoding function, wherein generating a balanced encoding function includes randomly selecting a balanced encoding function from a library of balanced encoding functions;
applying, by the processor, the balanced encoding function to the output of a first basic block; and
applying, by the processor, an inverse of the encoding function to the input of a second basic block, wherein the second basic block receives the encoded output of first basic block as an input,
wherein the output of the first basic block has N bits, where N is an integer,
wherein the encoded output of the first basic block has same number of N bits as the output of the first basic block, and
wherein the balanced encoding is configured to balance the value of each bit in the encoded output so that the output has an equal number of 0's and 1's at each bit position for all possible inputs.

2. The method of claim 1, wherein generating a balanced encoding function further includes using a random round robin process to select a balanced encoding function from the library of balanced encoding functions.

3. The method of claim 1, wherein generating a balanced encoding function further includes
randomly generating an encoding function; and
determining that the randomly generated encoding function is a balanced encoding function.

4. The method of claim 1, wherein generating a balanced encoding function further includes
randomly generating a first encoding function;

determining that the first randomly generated encoding function is not a balanced encoding function;
randomly generating a second encoding function; and
determining that the second randomly generated encoding function is a balanced encoding function.

5. The method of claim 1, wherein the keyed cryptographic operation is the data encryption standard.

6. The method of claim 1, wherein lookup tables implement the keyed cryptographic operation.

7. The method of claim 1, further comprising distributing the implementation of keyed cryptographic function.

8. A method of implementing a keyed cryptographic operation using a plurality of basic blocks, comprising:
generating, by a processor, a balanced encoding function;
applying, by the processor, the balanced encoding function to the output of a first basic block; and
applying, by the processor, an inverse of the encoding function to the input of a second basic block, wherein the second basic block receives the encoded output of first basic block as an input,
wherein the output of the first basic block has N bits, where N is an integer,
wherein the encoded output of the first basic block has same number of N bits as the output of the first basic block, and
wherein the balanced encoding is configured to balance the value of each bit in the encoded output so that the output has an equal number of 0's and 1's at each bit position for all possible inputs, and
wherein the keyed cryptographic operation is the advanced encryption standard.

9. A method of controlling a server that provides an application that implements a method of implementing a keyed cryptographic operation using a plurality of basic blocks, comprising:
receiving a request from a user for the application that implements a method of implementing a keyed cryptographic operation using a plurality of basic blocks; and
providing the user the application that implements a method of implementing a keyed cryptographic operation using a plurality of basic blocks, wherein the application was created by:
generating, by a processor, a balanced encoding function;
applying, by the processor, the balanced encoding function to the output of a first basic block; and
applying, by the processor, an inverse of the encoding function to the input of a second basic block, wherein the second basic block receives the encoded output of first basic block as an input,
wherein the output of the first basic block has N bits, where N is an integer,
wherein the encoded output of the first basic block has same number of N bits as the output of the first basic block, and
wherein the balanced encoding is configured to balance the value of each bit in the encoded output so that for all possible encoded outputs the number of 0's and the number of 1's are equal.

10. The method of claim 9, wherein generating a balanced encoding function includes randomly selecting a balanced encoding function from a library of balanced encoding functions.

11. The method of claim 9, wherein generating a balanced encoding function includes using a random round robin process to select a balanced encoding function from a library of balanced encoding functions.

12. The method of claim 9, wherein generating a balanced encoding function includes:
randomly generating an encoding function; and
determining that the randomly generated encoding function is a balanced encoding function.

13. The method of claim 9, wherein generating a balanced encoding function includes:
randomly generating a first encoding function;
determining that the first randomly generated encoding function is not a balanced encoding function;
randomly generating a second encoding function; and
determining that the second randomly generated encoding function is a balanced encoding function.

14. The method of claim 9, wherein lookup tables implement the keyed cryptographic operation.

15. A non-transitory machine-readable storage medium encoded with instructions for implementing a keyed cryptographic operation using a plurality of basic blocks, comprising:
instructions for generating, by a processor, a balanced encoding function, wherein instructions for generating a balanced encoding function includes instructions for randomly selecting a balanced encoding function from a library of balanced encoding functions;
instructions for applying, by the processor, the balanced encoding function to the output of a first basic block; and
instructions for applying, by the processor, an inverse of the encoding function to the input of a second basic block, wherein the second basic block receives the encoded output of first basic block as an input,
wherein the output of the first basic block has N bits, where N is an integer,
wherein the encoded output of the first basic block has same number of N bits as the output of the first basic block, and
wherein the balanced encoding is configured to balance the value of each bit in the encoded output so that the output has an equal number of 0's and 1's at each bit position for all possible inputs.

16. The non-transitory machine-readable storage medium of claim 15, wherein instructions for generating a balanced encoding function further includes instructions for using a random round robin process to select the balanced encoding function from a library of balanced encoding functions.

17. The non-transitory machine-readable storage medium of claim 15, wherein instructions for generating a balanced encoding function further includes:
instructions for randomly generating an encoding function; and
instructions for determining that the randomly generated encoding function is a balanced encoding function.

18. The non-transitory machine-readable storage medium of claim 15, wherein instructions for generating a balanced encoding function further includes:
instructions for randomly generating a first encoding function;
instructions for determining that the first randomly generated encoding function is not a balanced encoding function;
instructions for randomly generating a second encoding function; and
instructions for determining that the second randomly generated encoding function is a balanced encoding function.

* * * * *